United States Patent
Clayton et al.

(10) Patent No.: US 10,612,683 B2
(45) Date of Patent: Apr. 7, 2020

(54) METHOD FOR RELEASING A FLUID FROM A PRESSURE VESSEL ASSEMBLY

(71) Applicant: Moog Controls Limited, Tewkesbury, Gloucestershire (GB)

(72) Inventors: Larry Clayton, Farmington, UT (US); Phil Elliott, Tewkesbury (GB); Pablo Tena Tobajas, Cheltenham (GB)

(73) Assignee: Moog Controls Limited, Gloucestershire (GB)

( * ) Notice: Subject to any disclaimer, the term of this patent is extended or adjusted under 35 U.S.C. 154(b) by 0 days.

(21) Appl. No.: 15/776,533

(22) PCT Filed: Nov. 18, 2016

(86) PCT No.: PCT/GB2016/053601
§ 371 (c)(1),
(2) Date: May 16, 2018

(87) PCT Pub. No.: WO2017/085503
PCT Pub. Date: May 26, 2017

(65) Prior Publication Data
US 2018/0347719 A1    Dec. 6, 2018

(30) Foreign Application Priority Data

Nov. 19, 2015    (GB) ................... 1520374.8

(51) Int. Cl.
*F16K 17/40*    (2006.01)
*F16K 31/02*    (2006.01)
*F17C 7/00*    (2006.01)

(52) U.S. Cl.
CPC .............. *F16K 31/025* (2013.01); *F17C 7/00* (2013.01); *F17C 2205/0314* (2013.01);
(Continued)

(58) Field of Classification Search
CPC .. F16K 31/025; F17C 7/00; F17C 2205/0314; F17C 2205/0326; F17C 2205/0332;
(Continued)

(56) References Cited

U.S. PATENT DOCUMENTS 3,323,531 A * 6/1967 Spellman ................ F41A 33/04
102/314
3,567,245 A * 3/1971 Ekstrom ............... B60R 21/268
137/68.11

(Continued)

FOREIGN PATENT DOCUMENTS

| CN | 101245894 A | 8/2008 |
| DE | 102014205712 A1 | 10/2015 |
| EP | 1855048 A1 | 11/2007 |

*Primary Examiner* — Minh Q Le
(74) *Attorney, Agent, or Firm* — Hodgson Russ LLP

(57) ABSTRACT

A method for releasing a fluid from a pressure vessel assembly, the method including the steps of providing: —a pressure vessel; a piezo electric device; and an electric field generator; arranging the piezo electric device in a sealed relationship with a part of the pressure vessel, thereby providing the pressure vessel assembly, providing a fluid contained within the pressure vessel assembly under pressure, and using the electric field generator to apply an electric field to the piezo electric device, such that the piezo electric device fails, thereby releasing the fluid from the pressure vessel assembly.

20 Claims, 11 Drawing Sheets

(52) U.S. Cl.
CPC ............ *F17C 2205/0326* (2013.01); *F17C 2205/0332* (2013.01); *F17C 2221/014* (2013.01); *F17C 2221/016* (2013.01); *F17C 2221/017* (2013.01); *F17C 2221/03* (2013.01); *F17C 2223/036* (2013.01); *F17C 2270/0181* (2013.01); *F17C 2270/0563* (2013.01); *F17C 2270/0772* (2013.01)

(58) Field of Classification Search
CPC .......... F17C 2221/014; F17C 2221/016; F17C 2221/017; F17C 2221/03; F17C 2223/036; F17C 2270/0181; F17C 2270/0563; F17C 2270/0772
USPC ................................ 137/68.11, 68.12, 70, 74
See application file for complete search history.

(56) References Cited

U.S. PATENT DOCUMENTS

| | | | | |
|---|---|---|---|---|
| 3,780,752 | A * | 12/1973 | Noddin | F16K 17/403 137/68.11 |
| 4,083,187 | A * | 4/1978 | Nagashima | F16K 17/403 137/68.3 |
| 4,219,126 | A * | 8/1980 | Oana | B65D 51/1638 220/203.08 |
| 5,251,871 | A * | 10/1993 | Suzuki | F16K 31/025 137/625.33 |
| 5,787,563 | A * | 8/1998 | Jenkins | B60R 21/268 219/91.2 |
| 5,820,162 | A * | 10/1998 | Fink | B60R 21/205 280/742 |
| 6,155,600 | A * | 12/2000 | Reynolds | B60R 21/264 222/3 |
| 6,267,001 | B1 * | 7/2001 | Duncan | F16K 13/04 137/68.11 |
| 6,866,057 | B1 * | 3/2005 | Buehrle, II | F16K 17/383 137/74 |
| 7,281,544 | B2 * | 10/2007 | Bocquart | F16K 31/02 137/68.11 |
| 2003/0135262 | A1 * | 7/2003 | Dretler | A61F 2/82 623/1.15 |
| 2005/0284511 | A1 * | 12/2005 | Welle | B01L 3/502738 136/211 |
| 2008/0197147 | A1 | 8/2008 | Gruson | |
| 2008/0310576 | A1 | 12/2008 | Brisson et al. | |
| 2012/0067430 | A1 * | 3/2012 | Deperraz | F16K 31/025 137/1 |
| 2013/0334236 | A1 * | 12/2013 | Gerstel | F17C 13/003 220/724 |
| 2015/0159810 | A1 * | 6/2015 | Leonard | F16K 17/16 137/68.23 |
| 2016/0102773 | A1 * | 4/2016 | Smith | F16K 17/403 137/74 |
| 2016/0102774 | A1 * | 4/2016 | Smith | F16K 17/403 137/74 |

* cited by examiner

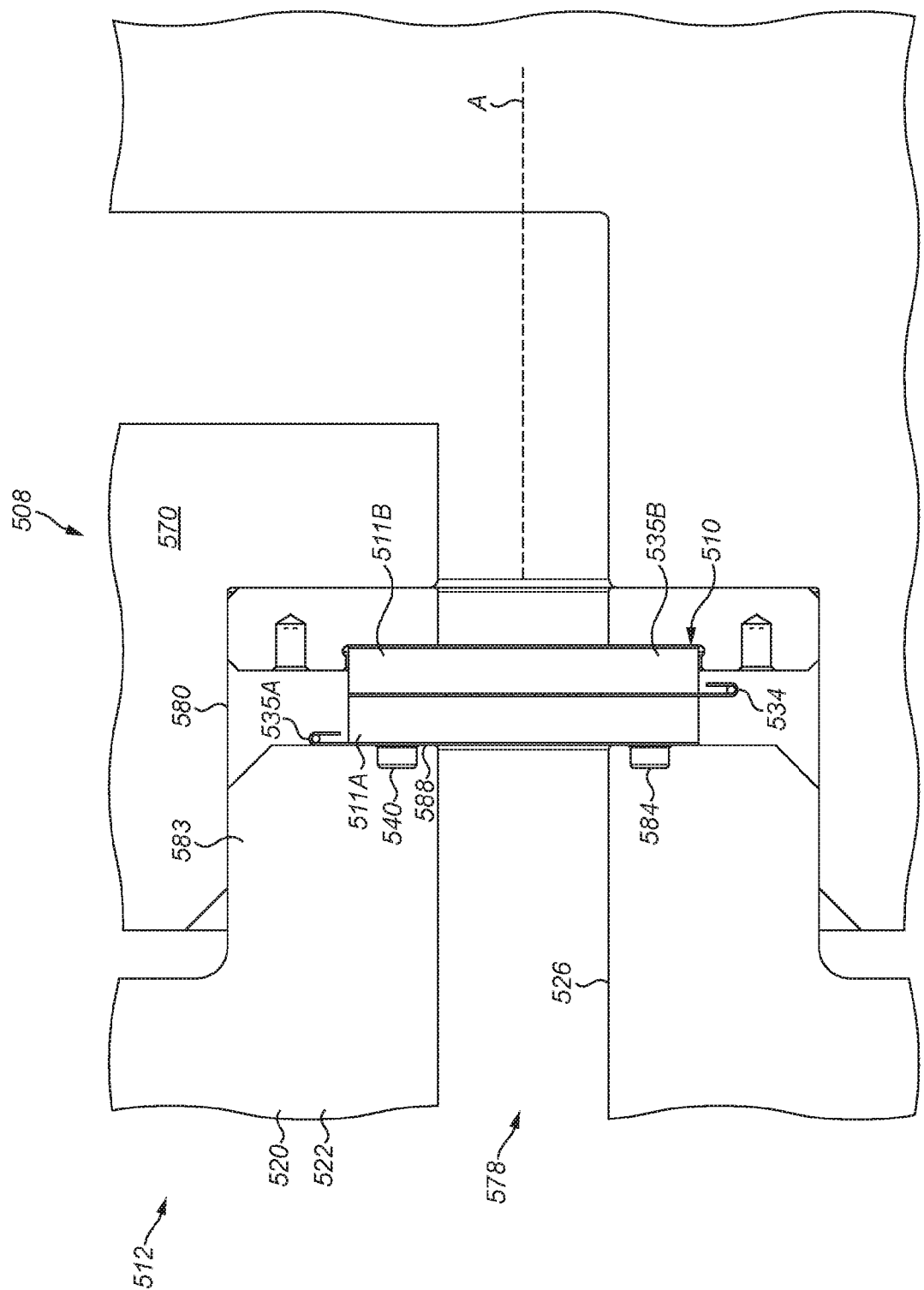

METHOD FOR RELEASING A FLUID FROM A PRESSURE VESSEL ASSEMBLY

TECHNICAL FIELD

The present invention relates to a method of releasing a fluid from a pressure vessel assembly.

BACKGROUND

Pneumatic stored energy systems have many applications. In transport safety they may be used to rapidly inflate various devices such as car air bags, aircraft passenger escape slides and helicopter flotation systems, in the case of an emergency incident. Due to their use in emergency incidents, rapid activation of the pneumatic stored energy system is necessary.

A pneumatic stored energy system may comprise, for example, a sealed vessel filled with a compressed helium-nitrogen (He/N) mixture, and some sort of firing mechanism to puncture a region of the vessel wall. A collection nozzle arranged about the vessel fluidly connects an inflatable device, folded in its uninflated state, to the vessel. In use, the firing mechanism causes a region of the vessel wall to puncture so as to supply the compressed He/N mixture via the nozzle to inflate the inflatable device.

Typically, pyrotechnic actuators have been used as a firing mechanism to trigger the pneumatic stored energy systems to inflate the specific device.

In use, an electric current is passed through a wire buried in a chemically reactive substance (the pyrotechnic), causing the pyrotechnic to burn. As the pyrotechnic burns, it produces a gas. The burn is contained within a sealed cavity of a container, and the pressure caused by the generation of exhaust gasses is applied to a piston fitted in the cavity at the end of the container. The piston moves due to the applied gas pressure and the linear movement can be used to shear through a diaphragm, or to bend and break a hollow pillar, thus releasing the stored pneumatic energy.

The use of pyrotechnic actuators is highly regulated. The potentially hazardous substances used in pyrotechnic actuators are difficult to handle and store. These potentially hazardous substances also require expensive and time consuming checks, for both the producer and end user. The potentially hazardous substances may also have a limited life-span, requiring replacement.

An alternate firing mechanism for activating a pneumatic stored energy system is through the use of shape memory alloys. The shape memory alloy may be caused to pull on a hollow break-off pillar and break it, thus releasing the stored pneumatic energy.

In this case the shape memory alloy is stretched during heat treatment such that it retains its stretched dimension during operation at normal, ambient, temperature. When the alloy is heated, for instance by passing an electrical current through it, it reverts to its unstretched dimensions. The change in length and resulting linear force can be used to break a hollow pillar.

However, shape memory alloy firing mechanisms often perform unreliably. Furthermore there remains the risk of unscheduled operation should the local environment conditions change.

An object of the present invention is to provide a method for releasing fluid from the pressure vessel assembly that is simple and/or reliable and/or lightweight, and/or of relatively small size and/or of low cost and/or which may be activated rapidly.

Thus according to the present invention there is provided a method for releasing a fluid from a pressure vessel assembly, the method including the steps of providing a pressure vessel, a piezo electric device and an electric field generator; arranging the piezo electric device in a sealed relationship with a part of the pressure vessel, thereby providing the pressure vessel assembly, providing a fluid contained within the pressure vessel assembly under pressure, and using the electric field generator to apply an electric field to the piezo electric device, such that the piezo electric device fails, thereby releasing the fluid from the pressure vessel assembly.

According to another aspect of the present invention there is provided a fluid release system substantially as described herein with reference to, or as shown in the accompanying drawings.

BRIEF DESCRIPTION OF DRAWINGS

The invention will now be described, by way of example only, with reference to the accompanying drawings, in which:

FIG. 5A shows part of a system for releasing fluid from a pressure vessel assembly according to the present invention suitable for use in the method of the present invention.

DESCRIPTION OF EMBODIMENTS OF THE INVENTION

Figure 1:
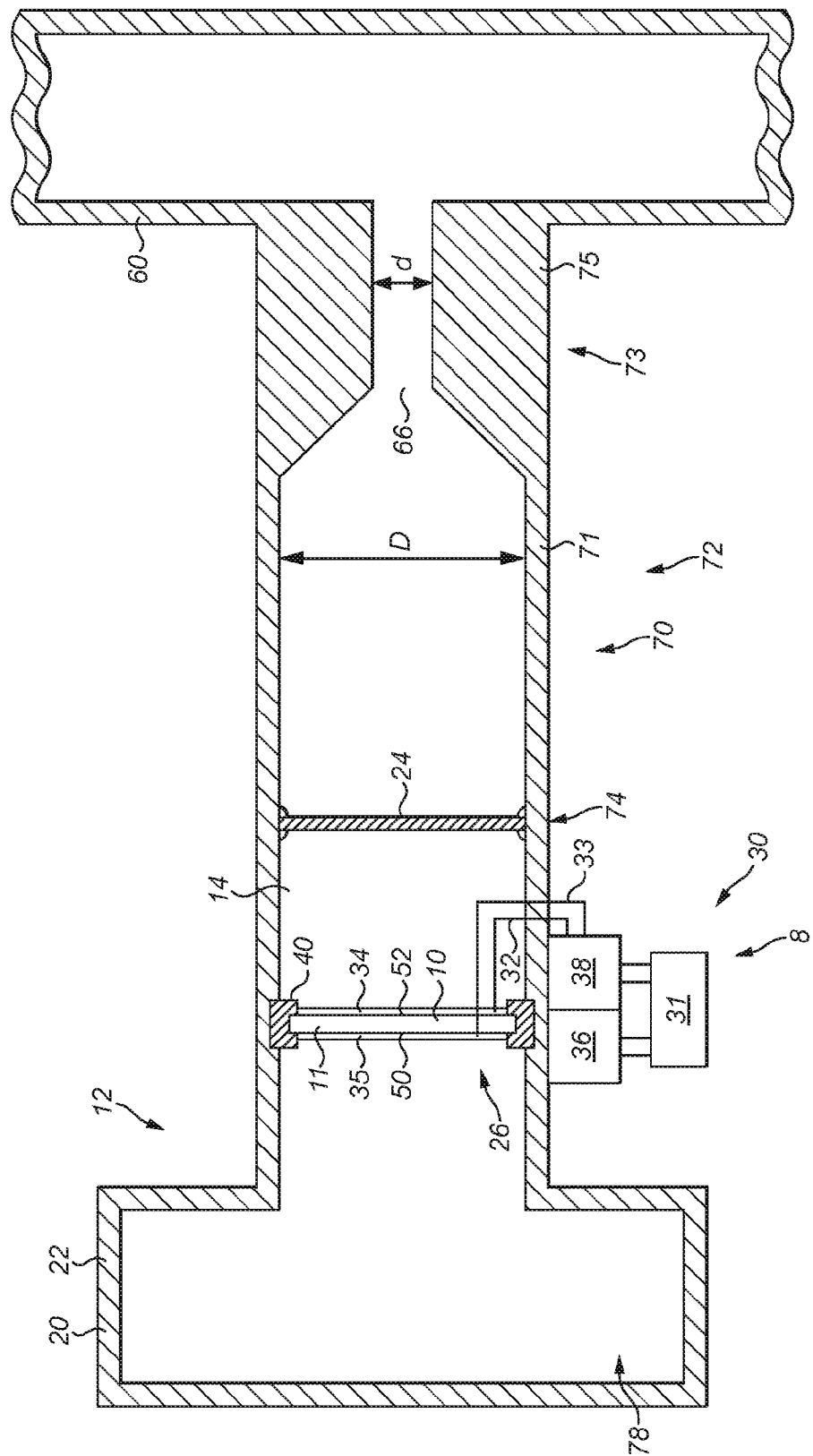
FIG. 1 shows a system for releasing fluid from a pressure vessel assembly according to the present invention suitable for use in the method of the present invention.

With reference to FIG. 1, there is shown a fluid release system 8 which includes a pressure vessel assembly 12 and an electric field generator 30. The pressure vessel assembly 12 primarily consists of a pressure vessel 20 and a piezoelectric device 10.

Pressure vessel 20 includes a pressure vessel wall 22, part of which defines an outlet 26.

The piezoelectric device includes a ceramic core 11 with an electrode 35 on a first face 50 of the ceramic core and an electrode 34 on a second face 52 of the ceramic core. The piezoelectric device 10 includes a seal 40 thereby providing the piezoelectric device in a sealed relationship with the outlet 26 of the pressure vessel 20. The pressure vessel and the piezoelectric device thereby provide a pressure vessel assembly 12.

The electric field generator 30 includes a control unit 31, a battery 36 and a capacitor 38. The capacitor and battery are suitably electrically connected and the capacitor is connected via wire 32 to electrode 34 and via wire 33 to electrode 35. The control unit 31 is capable of controlling the capacitor 38 and battery 36 so as to generate an electric field between electrodes 34 and 35, i.e. generating an electric field across the piezoelectric device.

The fluid release system 8 is connected to a conduit 70 having a conduit wall 71. Positioned within the conduit 70 is a filter 24. The conduit has a first portion 72 having a relatively large diameter D, and a second portion 73 having a relatively small diameter d. An end 74 of the first portion is coupled to an outlet 14 of the pressure vessel assembly. End 75 of the conduit is coupled to a fluid receiver 60.

Figure 2A:
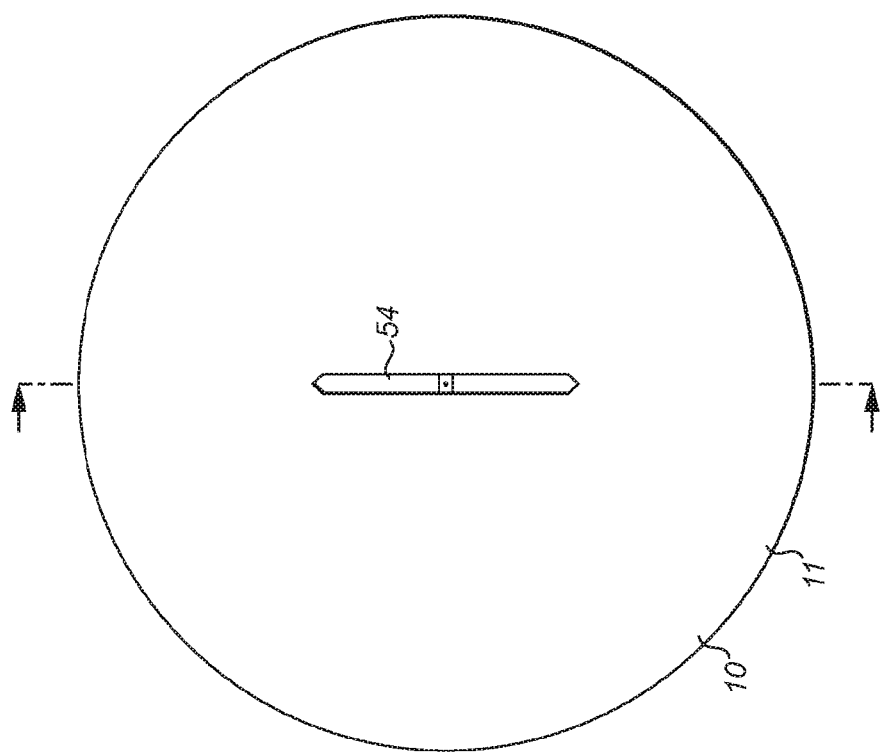
FIG. 2A shows a plan view and FIG. 2B shows a cross section of the piezo electric device of FIG. 1.
Figure 2B:
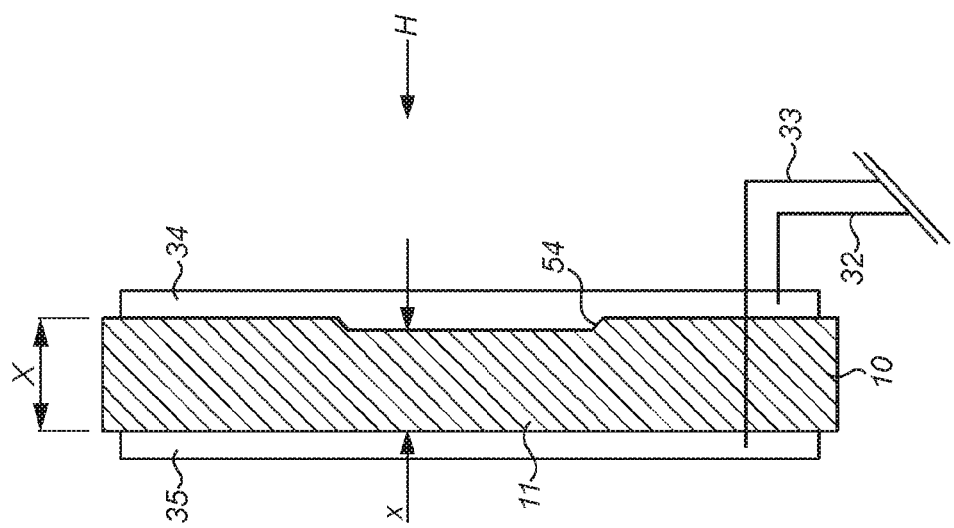

FIG. 2b shows an enlarged view of part of FIG. 1, and FIG. 2a shows a view of FIG. 2b taken in the direction of arrow H. As can be seen, the ceramic core 11 is circular and has a general thickness X. However, the ceramic core has been locally thinned to thickness x at region 54. As will be appreciated, region 54 provides a line of weakness. This line of weakness may be scored into the piezoelectric device, or alternatively the line of weakness may be manufactured during moulding of the piezoelectric device.

Operation of the fluid release system 8 in conjunction with the conduit 70 and the fluid receiver 60 is as follows:

In general terms, the pressure vessel assembly 12 is pressurised with a fluid 78 in one example a gas. The pressurised fluid 78 is initially prevented from escaping from the pressure vessel assembly 12 because the pressure vessel 20 is sealed as is the piezoelectric device 10 and the piezoelectric device 10 is sealed to the pressure vessel 20 via seal 40.

In this case, the fluid receiver 60 is an inflatable device. In order to inflate the inflatable device 60 with fluid 78 the electric field generator 30 is operated in such a manner as to cause failure of the piezoelectric device. Fluid 78 is then released from the pressure vessel 20 and passes into end 74 of the conduit 70, then through the filter 24, then through the flow control orifice 66 (defined by diameter D and diameter d), and then out of end 75 of the conduit and into the inflatable device 60, thereby inflating the inflatable device. Once fluid flow has stopped, the pressure vessel 20, conduit 70 and inflatable device 60 will all be at a common pressure.

In one embodiment, the control unit 31 provides a fixed polarity electric field, which is of sufficient strength/magnitude to cause the piezoelectric device to fail, thereby releasing the pressurised fluid 78 from the pressure vessel 20.

In a further embodiment, the control unit 31 applies an alternating polarity electric field to the piezoelectric device thereby causing it to fail. Under these circumstances, the piezoelectric device may fail by over-heating, i.e. the alternating polarity electric field may be of a sufficient strength and frequency to generate heat within the piezoelectric device, thereby causing it to lose strength and be unable to withstand the pressure of pressurised fluid 78.

Alternatively, or additionally, the alternating polarity electric field may cause the piezoelectric device to fail due to fatigue, i.e. the strength and frequency of the electric field may cause the device to flex backwards and forwards to such a degree as to cause fatigue cracks or the like resulting in the piezo electric device being unable to withstand the pressure of the pressurised fluid thereby failing.

In one embodiment, the shape of the piezoelectric device may be such that the pressure of the pressurised fluid 78 acting on the piezoelectric device when no electric field is being generated causes the piezoelectric device to be in a compressed state (for example the piezo electric device may be domed towards the pressure vessel 20, i.e. the first face 50 may be convex and the second face 52 may be concave).

Under these circumstances, in one embodiment when applying an electric field, the piezoelectric device may move to a shape wherein part of the piezoelectric device is under tension just prior to failure, either by virtue of the pressure of the pressurised fluid 78, and/or by virtue of the change of shape of the piezoelectric device. Typically, piezoelectric devices may be made from ceramic material and ceramic material is relatively weak in tension, but may be relatively strong under pressure.

As shown in FIG. 1, electric field generator 30 includes both a battery and a capacitor. In further embodiments, just a battery may be provided. In further embodiments, just a capacitor may be provided.

As shown in FIG. 1, the piezoelectric device is in wired communication with the electric field generator. In alternative embodiments the piezoelectric device may be in wireless communication with the electric field generator.

As will be appreciated, when the piezoelectric device fails, the pressurised fluid 78 may carry fragments or parts of the piezo electric device along the conduit. In order to prevent any such fragments from reaching the flow restricting orifice 66 and/or the fluid receiver 60, the filter 24 is provided. The filter prevents any fragments that may block or restrict the flow restricting orifice 66 or may damage the fluid receive 60 from passing along the conduit.

The flow restricting orifice limits how fast the fluid can pass through the orifice, and hence limits how fast the fluid receiver 60 is filled. When the fluid receiver 60 is an inflatable device the flow restricting orifice 66 therefore limits how fast the inflatable device is inflated.

Figure 3:
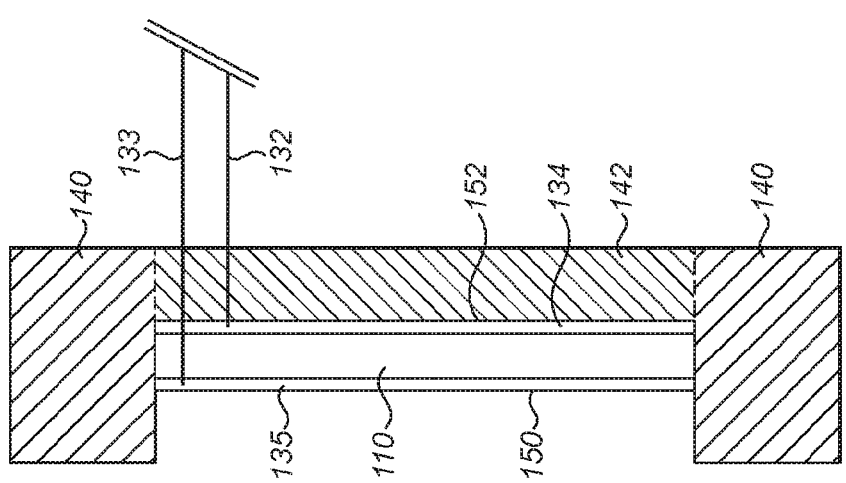
FIG. 3 shows a cross section of an alternative piezo electric device suitable for use in the method of the present invention.

With reference to FIG. 3, there is shown a further embodiment of a piezoelectric device 110 with components which fulfil the same function as those shown in piezoelectric device 10 labelled 100 greater. In this case, a seal 142 is provided on one side of the piezoelectric device, in this case that side of the piezoelectric device opposite from the pressure vessel 20, i.e. on that side of the piezoelectric device downstream of the pressurised fluid 78.

Figure 4:
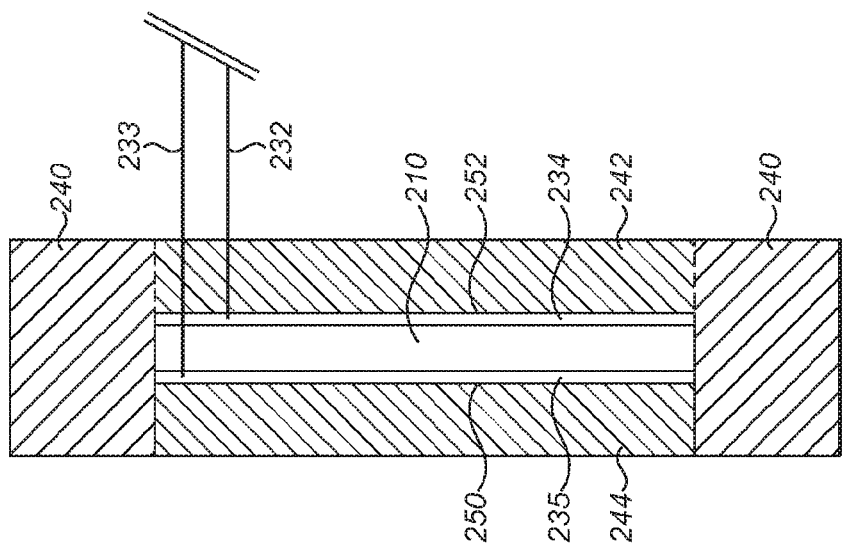
FIG. 4 shows a cross section of an alternative piezo electric device suitable for use in the method of the present invention.

FIG. 4 shows a further embodiment of a piezoelectric device 210 with components which fulfil the same function as those of piezoelectric device 10 labelled 200 greater. In this case the piezoelectric device 210 includes a seal 242 similar to seal 142 and further includes a seal 244 on that side of the piezoelectric device 210 which faces the pressure vessel 20, i.e. on an upstream side of the piezoelectric device when considering pressurised fluid 78.

Seals 142, 242 and 244 protect the ceramic core from dampness and the like.

With reference to FIGS. 5A, 5B, 5C, 5D and 5E there is shown part of a fluid release system 508 wherein features in which fulfil the same function as those shown in FIG. 1 are labelled 500 greater.

FIG. 5A shows part of the pressure vessel 520 including an outlet 526 from the pressure vessel. Also shown is a conduit 570. The conduit 570 includes a recess 580 within which shim 581 is positioned. The piezo electric device 510 sits within a recess 582 (see FIG. 5E) of the shim 581. The pressure vessel 520 includes a spigot 583 which also fits within recess 580 of conduit 570. The spigot 583 includes an annular recess 584 within which sits seal 540. The piezo electric device 510 includes an axis A and the piezo electric device 510 is axially clamped between the spigot 583 of the pressure vessel 520 and the conduit 570 by bolts or the like (not shown).

The seal 540 is therefore axially compressed and prevents leakage of pressurised fluid from the pressure vessel assembly 512.

The recess 582 is generally circular and includes a cut out 585. The shim includes a central hole 586 having an edge 587. The spigot 583 includes a corresponding edge 588.

Figure 5B:
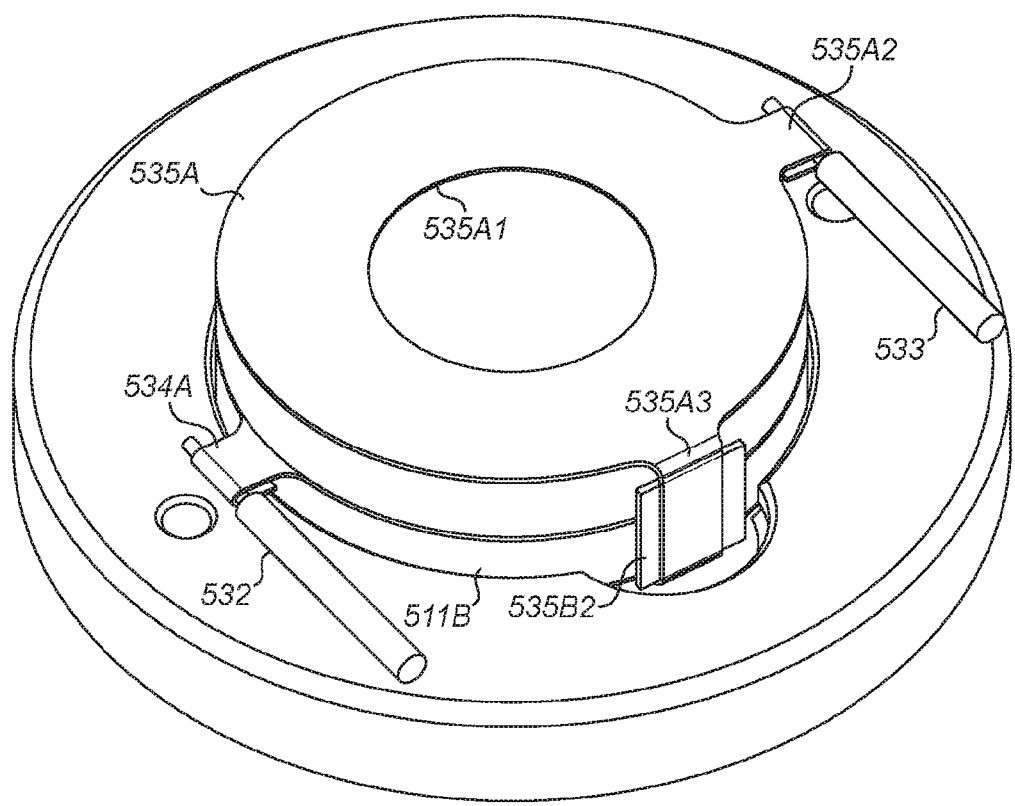
FIGS. 5B, 5C, 5D, 5E and 5F show various views of the embodiment shown in FIG. 5A.
Figure 5C:
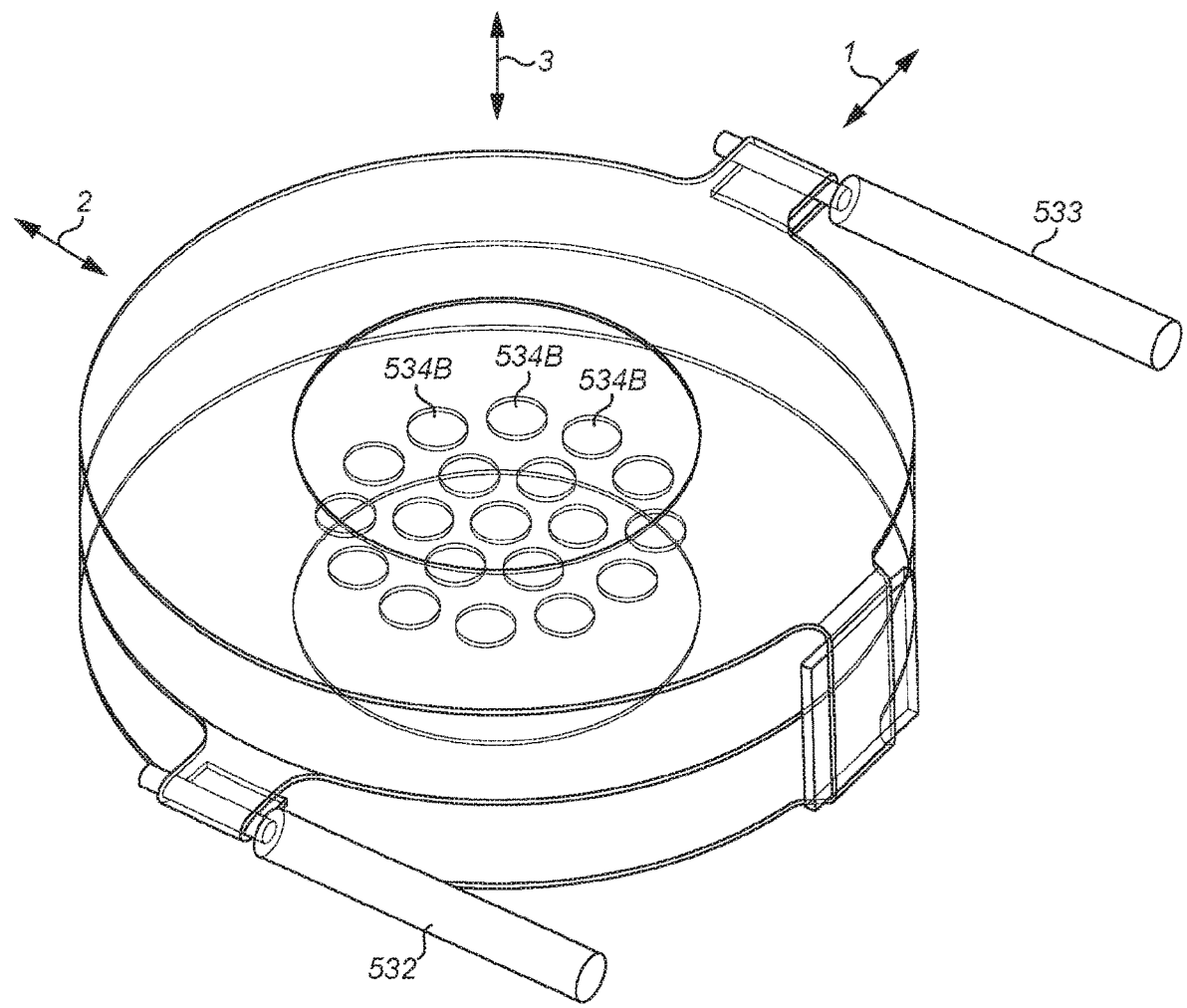
Figure 5D:
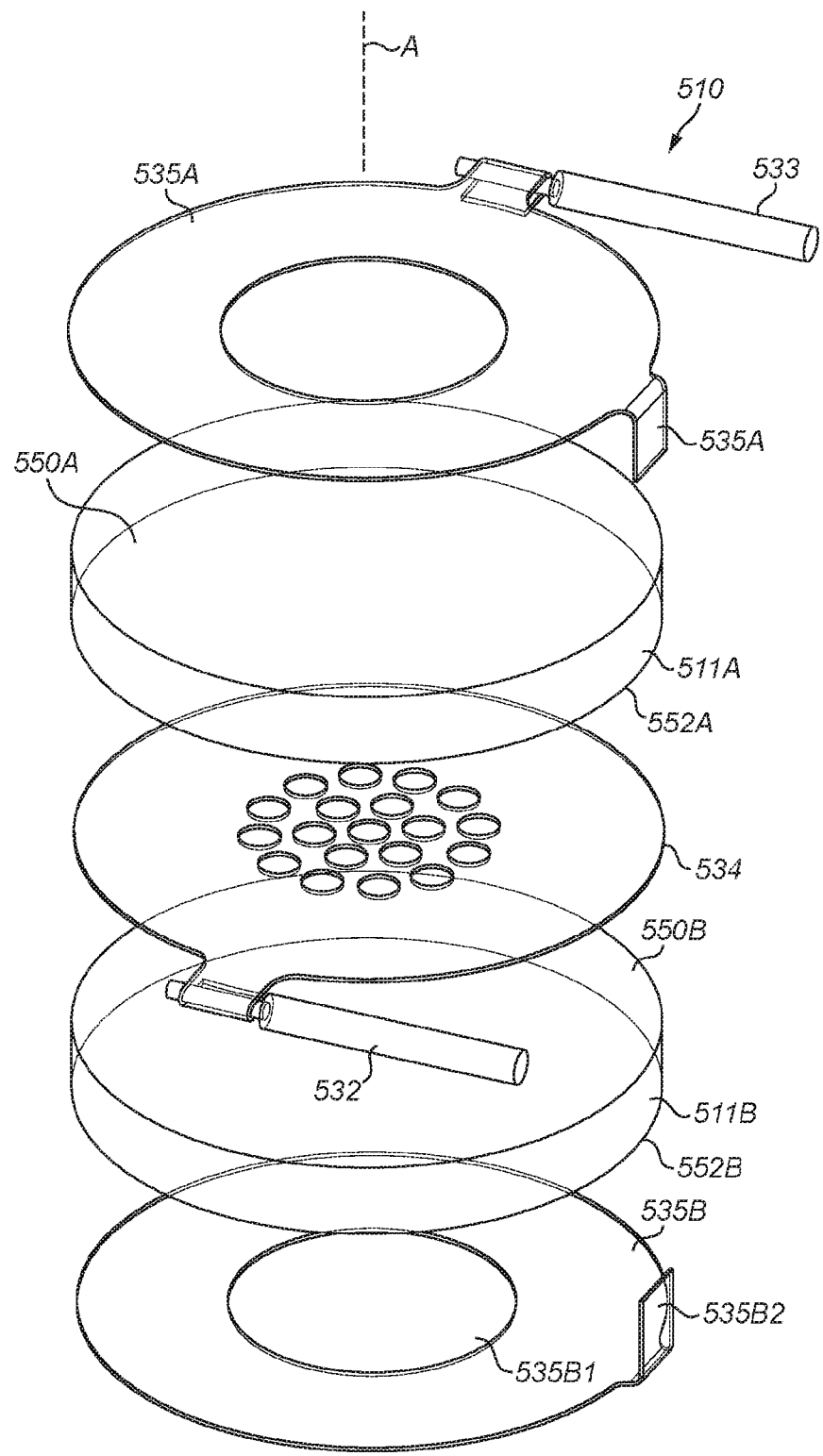
Figure 5E:
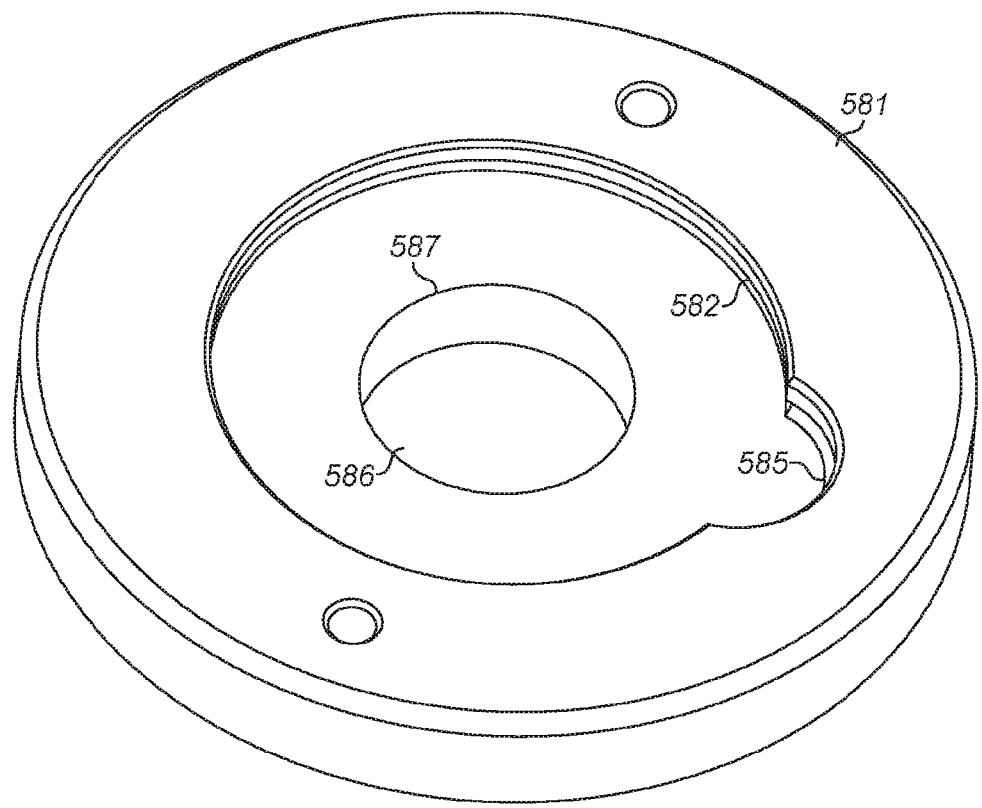
Figure 5F:
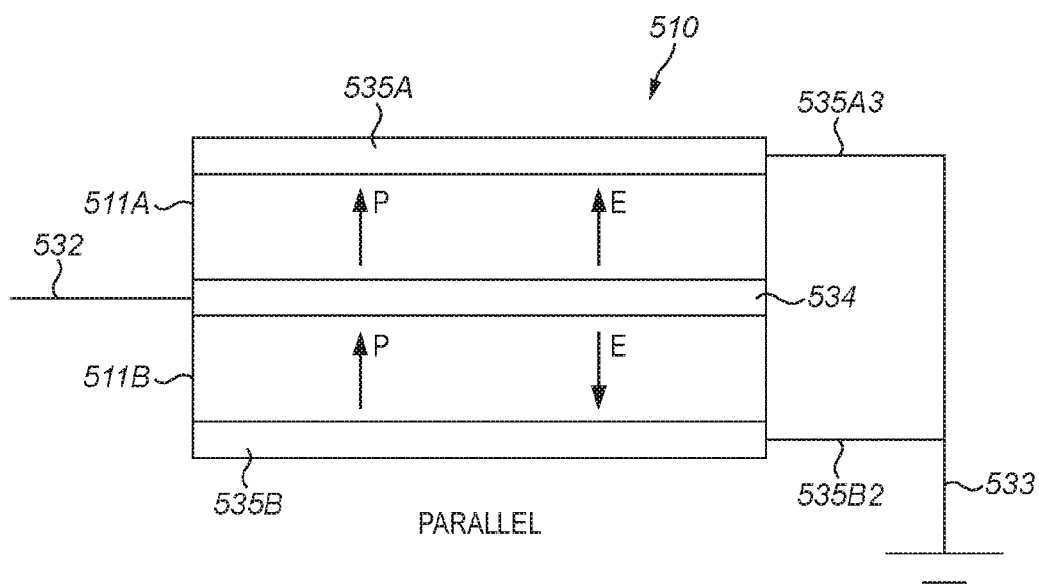

FIG. 5D shows an exploded view of the piezo electric device 510. In this case the piezo electric device includes two piezo electric members 511A and 511B in the form of ceramic discs. Ceramic disc 511A has a first face 550A and a second face 552A. The ceramic disc 511B has a first face 550B and a second face 552B.

Electrode 534 is generally circular and has an external tab 534A (see FIG. 5B). The electrode 534 also has a series of holes 534B in a central region of the disc. The wire 532 is electrically connected to the external tab 534A.

The piezo electric device 510 includes two further electrodes 535A and 535B. Electrode 535A is generally circular and includes a central hole 535A1. Electrode 535A also includes a first external tab 535A2 and a second external tab 535A3 (see FIG. 5B).

Electrode 535B is generally circular and includes a central hole 535B1 and an external tab 535B2.

The first faces 550A and 550B and the second faces 552A and 552B of the piezo electric members 511A and 511B include a electrically conductive coating (not shown). This electrically conducting coating is not suitable for direct connection to wires 532 or 533. Hence the connection between wire 532 and the electrically conducted coating on second face 552A and first face 550B is via the electrode 534. Similarly the electrical connection between wire 533 and the electrically conductive coating on the first face 550A of the piezo electric member 511A is via the electrode 535A. The electrical connection between wire 533 and the electrically conductive coating on the second face 552B of the piezo electric member 511B is via the electrode 535A, then via the external tab 535A3 which is electrically connected to the external tab 535B2 which in turn is electrically connected to the electrode 535B, which in turn is electrically connected to the electrically conductive coating on the second face 552B of the piezo electric member 511B.

As will be appreciated, the electrically conductive coating ensures there is an even electric field even in the regions of the piezo electric device adjacent hole 535A1, 535B1 and holes 534B.

FIG. 5D shows an exploded view, but in use the components shown in FIG. 5D are all fixed mechanically together.

The piezo electric members 511A and 511B are both polarised in the same direction, in this case in the direction of axis A.

The piezo electric device 510 is assembled into the shim 581 such that the external tab 535B2 fits into the cut out 585. The dimensions and tolerances of the recess 582 and the external diameter of the piezo electric member 511B mean that the piezo electric device 510 is accurately positioned coaxially with the shim. The external diameter of the shim and the internal diameter of the recess 580 mean that the piezo electric device 10 is accurately aligned with the axis of the conduit when assembled as shown in FIG. 5A. The external and internal diameter of the spigot 583 are dimensioned and toleranced in conjunction with the recess 580 such that edge 588 is accurately aligned with edge 587 when assembled as shown in FIG. 5A.

Operation of the fluid release system 508 is as follows.

As will be appreciated, as shown in FIG. 5A the piezo electric device 510 retains pressurised fluid in the pressure vessel 520, i.e. the region to the left hand side of the piezo electric device 510 when viewing FIG. 5A is pressurised. The region to the right hand side of the piezo electric device 510 is at a lower pressure, for example atmospheric pressure.

In outline, the piezo electric device 510 has certain natural frequencies which can be excited by providing an appropriate alternating electric field. As will be appreciated, sufficient excitation at the natural frequency will cause the piezo electric device 510 to fail thereby releasing pressurised fluid 578.

In more detail, FIG. 5 shows arrows, 1, 2 and 3 which represent a coordinate system. Arrow 3 shows the "3-direction" of the piezo electric device and is the same as axis A. Arrows 1 and 2 show the "1-direction" and "2-direction" of the piezo electric device. The 1-direction and 2-directions are both perpendicular to the 3-direction and perpendicular to each other. The 1 and 2 directions lie parallel to the plane of the piezo electric device 510.

For the purposes of explanation of natural frequencies, consider a single piezo electric element in isolation, e.g. consider piezo electric element 511A in isolation. One natural frequency mode of the piezo electric element 511A in isolation is vibration in the 3-direction, i.e. in the axis A direction, i.e. in a longitudinal direction. An alternative natural frequency mode is to vibrate in a radial direction, i.e. vibrations in the 1-direction and 2-direction. Such radial vibrations are planar oscillations since they all occur within the plane of the piezo electric device. An oscillating electric field in the 3-direction is piezo electrically coupled to radial motion in the ½ direction. This is known as planar coupling or three-one coupling and arises from the piezo electric properties of the material. Axial expansion in the three direction is due to 3-3 coupling or the thickness coupling factor for a thin disc. The planar coupling factor of a thin disc represents the coupling between the electric field in the 3-direction (parallel to the disc axis) and simultaneous mechanical effects in the 1 and 2 directions that result in radial vibrations. This is known as radial coupling.

The thickness coupling factor represents the coupling between an electric field in the 3-direction and the mechanical vibrations in the 3-direction of a thin planar object (such as piezo electric element 511A).

Typically the natural (or resonant) frequency of the thickness mode of a thin planar object such as element 511A is higher than that of its longitudinal mode, i.e. the natural frequency for vibrating in the ½ direction of element 511A is far higher than the natural frequency for vibrating in the 3-direction.

Thus, the piezo electric element 511A will have various natural frequencies, two of which are described above. Providing an alternating electric field at a particular natural frequency will cause the piezo electric element 511A to be excited at that frequency and therefore vibrate at that frequency. The piezo electric device 510 is not a single piezo electric element in isolation, rather it is a combination of two piezo electric elements restrained around a rim. Nevertheless, the piezo electric device 510 will have various natural frequencies and when excited at a particular natural frequency, will vibrate in a particular mode. Continued vibration in that mode at that frequency will cause the piezo electric device 510 to fail.

As described above, the piezo electric members 511A and 511B are both polarised in the same direction, in this case in the direction of axis A. However, as will be appreciated, when a voltage is applied to the wires 532 and 533 then electrode 534 in conjunction with electrode 535A will produce a first electric field in a first direction and simultaneously a second electric field will be generated between electrodes 534 and 535B, but this electric field will be in a second direction which is opposite to the first direction. This is because electrodes 535A and 535B are electrically connected and are positioned outside the piezo electric members 511A and 511B whereas electrode 534B is positioned between the piezo electric members 511A and 511B.

The effect of this is that whilst both piezo electric members are polarised in the same direction a voltage between wires 532 and 533 will create electric fields around the piezo electric members 511A and 511B in opposite directions, and as such one piezo electric member will contract whilst other piezo electric member will expand.

If an alternating electric field is applied at a frequency at or near the natural frequency of the piezo electric device 510 in a particular mode (e.g. in a mode akin to the radial mode of a piezo electric element in isolation), then the piezo electric device 510 will vibrate in that mode until such time as it fails. Clearly, if the electric field is alternated at a frequency at or near a different natural frequency of the piezo electric device 510, then the piezo electric device will vibrate in a different mode but will still fail.

Piezo electric members 511A and 511B together with the electrodes 535A, 535B and 534 define a biomorph that is parallel wired. See in particular FIG. 5F which shows a cross section of the piezo electric device 510 schematically. As can be seen the polarity P of the piezo electric members 511A and 511B is in the same direction but when a particular voltage is applied across wires 532 and 533 the electric fields in piezo electric members 511A and 511B are in opposite directions thereby causing one of piezo electric members 511A and 511B to contract whilst the other expands.

Figure 8:
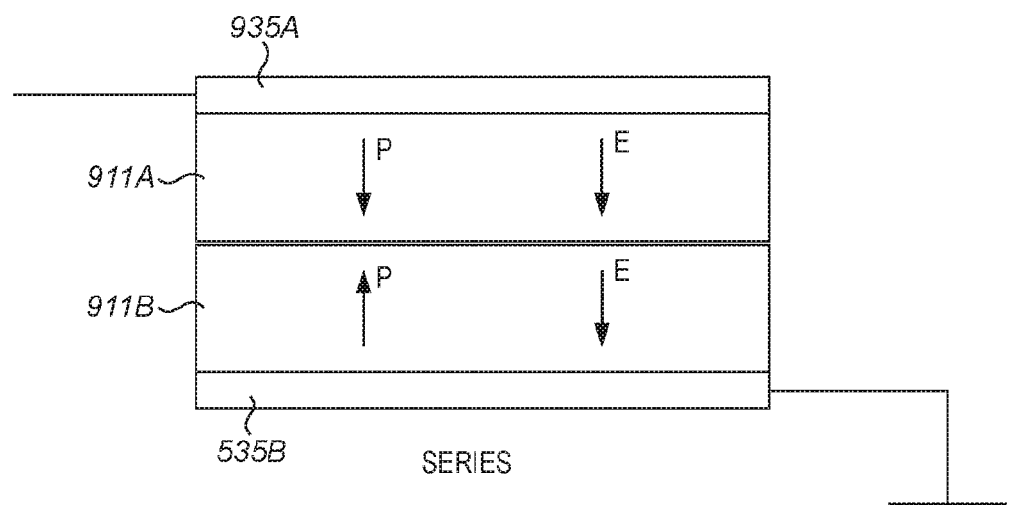
FIG. 8 shows a schematic view of a series wired biomorph suitable for use with the present invention.

In an alternative embodiment the piezo electric device may be provided as a biomorph which is series wired (see in particular FIG. 8). In this case the polarities P of the elements 911A and 911B is reversed relative to each other, there is no central electrode the equivalent of electrode 534, rather this is an insulating layer (for example alumina), and the alternating voltage will be applied to the external electrodes 935A and 935B which are not electrically coupled together by any external tabs or the like. As will be appreciated from FIG. 8 when the voltage is applied across electrodes 935A and 935B the electric field in piezo electric members 911A and 911B will be in the same direction thereby causing one of piezo electric members 911A or 911B to contract, whilst the other expands.

As will be appreciated from FIG. 5A, the piezo electric device 510 is clamped around its periphery between spigot 583 and shim 581. However, there is no clamping of the piezo electric device 510 radially inboard of edges 587 and 588. As will be appreciated, that portion of the piezo electric device 510 inboard of edges 587 and 588 will have a natural frequency and this natural frequency can be excited if an alternating voltage is applied at that frequency to wires 532 and 533. Typically, the material of the piezo electric members 511A and 511B is ceramic, and ceramic has relatively little internal hysteresis. As can be seen from FIGS. 5B and 5D the central hole 535A1 and central hole 535B1 of the electrodes 534 and 535 is approximately the same as diameter central hole 586 of the shim. As such substantially all of electrode 535A and 535B is clamped between the spigot and the shim, and as such will not vibrate at the natural frequency of the piezo electric device and as such cannot contribute any hysteresis, and hence the natural frequency of the piezo electric device 510 is not damped by either electrode 535A or 535B.

Whilst the central region of electrode 534 can contribute to the damping of the piezo electric device 510, it is this central region that includes the plurality of holes 534B. As such the hysteresis damping contribution made by the electrode 534 to the damping on the piezo electric device 510 is less than would be the case in the event that the electrode 534 have no holes 534B.

As a consequence, the central part of the piezo electric device 510 is relatively poorly damped and therefore exciting this portion at its natural frequency by applying alternating voltage to wires 532 and 533 will cause a vibration with a relatively large amplitude, and this relatively large amplitude will be sufficient to overcome the mechanical properties of the piezo electric members 511A and 511B which will crack and disintegrate. Once such disintegration has occurred, the pressurised fluid in the pressure vessel 20 is released into the conduit 70.

In one example the natural frequency of a piezo electric device 510 when assembled might be of the order of tens of kilohertz, for example 60 kHz.

Since the actual frequency is relatively high, then it is possible to burst or otherwise fail the piezo electric device relatively quickly, for example it is possible to fail the piezo electric device in less than 10 ms.

The natural frequencies of the piezo electric device 510 depends upon various factors such as the diameter and thickness of the piezo electric members 511A and 511B, the clamping force between the spigot 583 and the shim 581, the material properties of the piezo electric members 511A and 511B, the temperature, the pressure within the pressure vessel 20 and the pressure within conduit 70. In use, the pressure within the pressure vessel 20 might vary (as a result of temperature changes of the fluid in the pressure vessel). Also the temperature of the piezo electric members 511A and 511B might vary. As such, in use the natural frequency of the piezo electric device 510 may vary. Accordingly, the frequency of the electric voltage applied between wires 532 and 533 can be swept across a relatively narrow range of frequencies, that range being known to contain the natural frequency of the piezo electric device 510. By way of example, if, as installed, a natural frequency of the piezo electric device 510 is 60 kHz, then in order to burst the piezo electric device 510 and alternating electric voltage could be applied across wires 532 and 533 starting at 55 kHz and ending at 65 kHz. Such a sweep can be done relatively quickly and in the event that the natural frequency of the piezo electric device is fallen to, for example 59 kHz, or has risen to for example 61 kHz then sweeping between 55 kHz and 65 kHz will ensure failure of the piezo electric device 510. The sweep can be carried out either from 55 kHz to 65 kHz or alternatively from 65 kHz to 55 kHz, i.e. during the sweep, the frequency increases, or alternatively during the sweep the frequency decreases. In either event the piezo electric device will be excited at its natural frequency and will therefore fail.

Alternatively, a fixed alternating voltage frequency can be chosen, that frequency being slightly lower than the lowest in use natural frequency of the piezo electric device. Thus, taking the above example, as installed the natural frequency might be 60 kHz, but in use the natural frequency might vary between 59 kHz and 61 kHz. If a frequency slightly lower than 59 kHz, in this example 58.5 kHz is used, then initially the piezo electric device will be excited below its natural frequency, However, even though the piezo electric device is being excited below its natural frequency, the energy of excitement will cause the piezo electric device to heat up which in turn will cause a lowering of the natural frequency of the piezo electric device such that the natural frequency of the piezo electric device falls to the exciting frequency (in this case 58.5 kHz). Thus, the first example above the exciting frequency was swept (either up or down) through the natural frequency of the piezo electric device, whereas in the second example the natural frequency of the piezo electric device was changed (by heating) such that it fell to the exciting frequency.

The advantage of exciting the piezo electric device at any natural frequency (i.e. in any mode) is that relatively little power is required to fracture or otherwise fail the piezo electric device. That said, it is not necessary to vibrate the piezo electric device at a natural frequency, or even near a natural frequency. As described above, failure of the piezo electric device can occur by overheating or fatigue or the like.

As described above, the electrodes 535A and 535B have a single central hole which advantageously ensures that the material of the electrode does not contribute to the damping hysteresis of the piezo electric members 511A and 511B. However, single holes do not contribute to the strength of the piezo electric device in respect of withstanding the pressure within the pressure vessel 20. Depending upon the pressure to be retained, it may be advantageous to have one or more of the electrodes 534, 535A or 535B as solid discs without any central hole or without any series of central holes (i.e. without any perforations).

As will be appreciated, any of electrodes 535A, 534 and 535B could either have a single central hole, or could be perforated, or could be solid. As such, there are 27 permutations for the type of electrode installed in a particular position in respect of a biomorph.

As described above, where a biomorph is series wired, such a biomorph has two electrodes and an insulating layer. The options for the electrodes are again a solid electrode, an electrode with a single hole and an electrode with perforations, and the options for the insulating layer are a solid layer, an insulating layer with a single hole, and an insulating layer with perforations, and again there are 27 permutations available in respect of a series wired biomorph.

Figure 6:
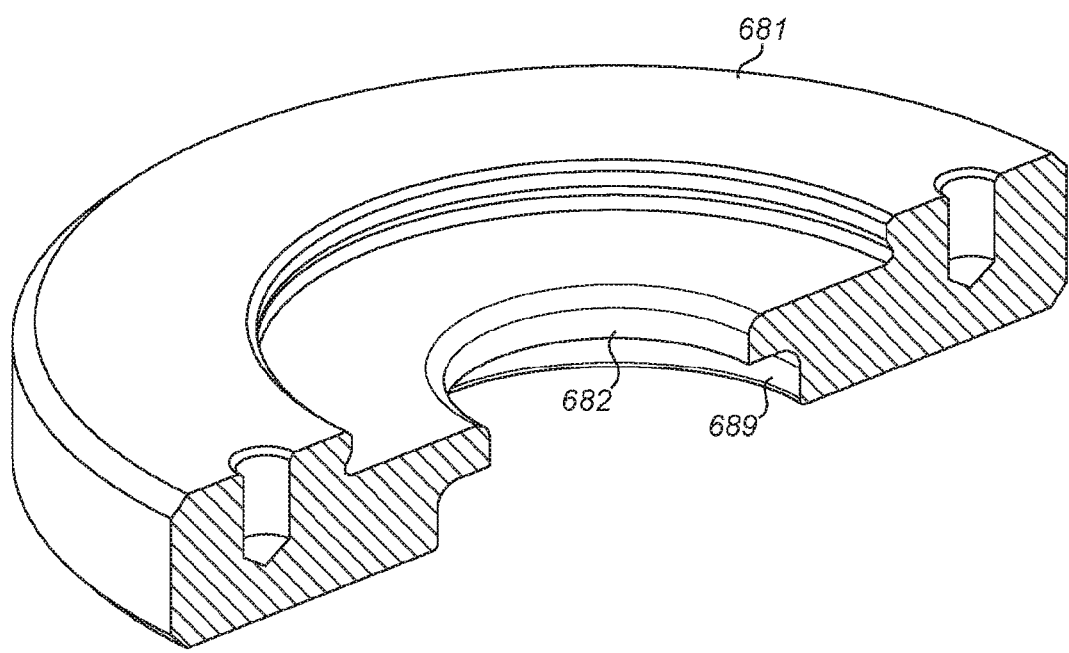
FIG. 6 shows an alternative shim.

With reference to FIG. 6 there is shown a shim 681 which can be used in place of shim 581. Comparing and contrasting FIG. 6 with FIG. 5E it can be seen that edge 687 is more rounded than edge 587. Rounding of edge 687 will reduce the local stresses induced in the second face 552B in the vicinity of this edge. Furthermore, shim 681 includes a recess 689 which will cause the lip of the shim region of edge 687 to be more flexible than that lip shown in FIG. 5E. "Tuning" of the installed condition of a particular installation is possible such that for a particular installation the piezo electric device does fail when commanded (i.e. when an appropriate electric field is applied) but does not fail in an "uncommanded" manner.

Figure 7:
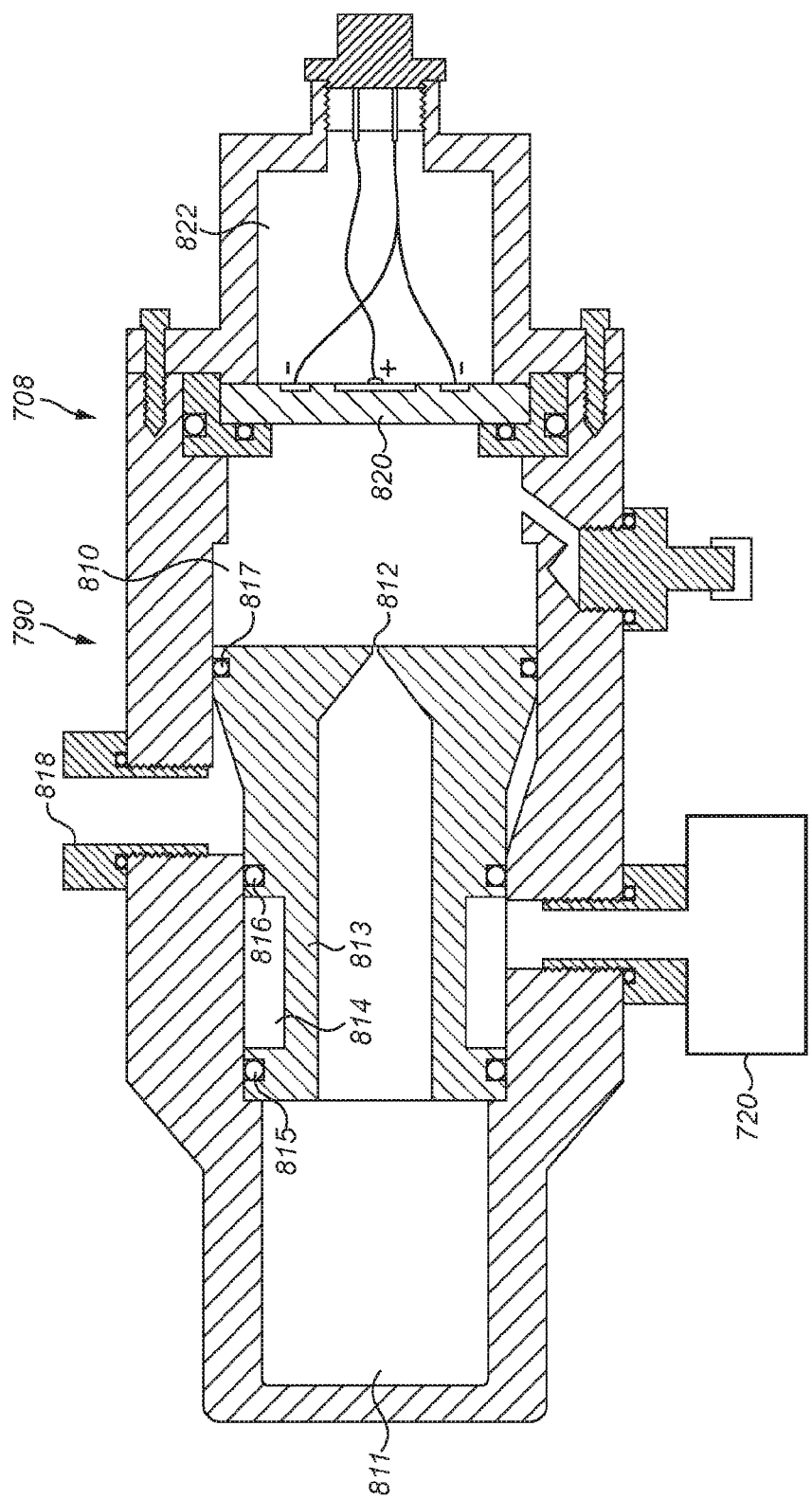
FIG. 7 shows a further embodiment of a system for releasing fluid from a pressure vessel assembly according to the present invention suitable for use in the method of the present invention.

With reference to FIG. 7 there is shown an alternative fluid release system 708. In this case there is a first pressure vessel 720 and a second pressure vessel 790. The second pressure vessel includes a first volume 810 and a second volume 811 connected by a restriction orifice 812 provided in a slideable piston 813. The slideable piston includes an annular groove 814 positioned between seals 815 and 816. The piston includes a further seal 817. As shown in FIG. 7, the pressure vessel 720 is connected fluidly to the annular groove 814 between seals 815 and 816. The outlet 818 is fluidly connected to an annular region surrounding the piston formed between seals 816 and 817.

The piezo electric device 820 acts to prevent pressurised fluid within the first and second volumes 810 and 811 reaching an expansion volume 822.

In this example, the pressure vessel 17 is pressurised at a relatively high pressure, in this example 3000 psi. The expansion of volume 822 is at a relatively low pressure, in this case 15 psi (e.g. atmospheric pressure). The first and second volumes are pressurised to a pressure between the expansion and volume pressure and the pressure in the pressure vessel 720, i.e. between 15 psi and 3000 psi, in this example 400 psi.

The pressurised fluid in the pressure vessel 720 can be released via outlet 818 as follows.

When it is required to release the pressure in the pressure vessel 720 the piezo electric device 820 can be caused to fail by any of the method described above. Failure of the piezo electric device 820 will fluidly connect the expansion volume 822 to the first volume 810. As can be seen from FIG. 7, the expansion volume 822 is approximately the same as the first volume 810 and initially is at a significantly lower pressure than the first volume and as such when the piezo electric device fails thereby connecting the first volume with the expansion of volume the pressure in the first volume will drop to a proximately half, i.e. will drop to approximately 200 psi and the pressure in the expansion volume will increase to approximately 200 psi.

As can be seen from FIG. 7, the piezo electric device has a diametric extent equivalent to the diameter of the expansion volume, and therefore once the piezo electric device 820 has failed then the pressure in the first volume and expansion volume will equalise very quickly, to, in this example 200 psi. However, because the restriction orifice 812 is several orders of magnitude smaller than the diameter of the piezo electric device 820, when the piezo electric device fails, the first expansion volumes equalise in pressure with the first volume far quicker than the time taken to equalise the pressure of the second volume and the combined first/expansion volumes. As such, the pressure in the second volume 811 will remain significantly above the pressure in the combined first volume expansion volume for a period of time. During this period of time the pressure on the left hand side of the piston 813 will be greater than the pressure on the right hand side of the piston and, even taking into account the effective piston on the right hand side of the piston is greater than the effective piston on the left hand side of the piston, the piston will nevertheless move to the right when viewing FIG. 7 thereby causing the annular groove 814 to move to the right such that it fluidly connects the pressure vessel 720 with the outlet 818.

As will be appreciated, the debris from the failed piezo electric device 820 cannot contaminate the flow out of outlet 818 (such contamination being prevented by seals 817 and 815). Furthermore, the piezo electric device 820 does not need to withstand the pressure within pressure vessel 720, rather it only has to withstand the pressure within the first and second volumes, in this example piezo electric device only has to withstand 400 psi rather than 3000 psi.

Thus, the failure of the piezo electric device releases the pressurised fluid contained within the first and second volumes by virtue of that fluid passing through the space the piezo electric device occupied prior to its failure. Furthermore, failure of the piezo electric device 820 cause releasing of the fluid from the pressure vessel 720 by virtue of operating a valve, the valve being defined by the piston and its operation occurring when the piston moves to the right thereby opening the "valve".

Whereas FIG. 7 shows a valve which is opened upon failure of the piezo electric device, it will be appreciated that by arranging the outlet 818 to a position between seals 815 and 814 the valve will initially be open. Failure of the piezo electric device could cause the piston to move to the right resulting in seal 815 blocking the repositioned (and smaller) outlet 818 thereby resulting in closing of the valve.

In further embodiments, a filter 24 may not be required. In further embodiments, a flow restricting orifice 66 may not be required. In further embodiments, a fluid receiver 60 may not be required. In a further embodiment, the flow release system may simply release a fluid from pressure vessel 20 into the atmosphere. In a further embodiment, the pressure vessel 20 may be an inflatable device, having been inflated by the pressurised fluid 78. The fluid release system may simply cause deflation of pressure vessel 20 by releasing the pressurised fluid to the environment.

Any type of suitable piezo electric device may be used, having any suitable shape, any suitable thickness, any suitable configuration of electrodes. The piezo electric device may or may not include a predetermined region of failure. Where a predetermined region of failure is provided it may be provided with any suitable line of weakness or other formation or shape, the formation or shape defining a region of failure may be formed in any suitable manner.

As described above, a piezo electric device fails in such a manner so as to allow escape of the pressurised fluid from the pressure vessel assembly. Thus, the piezo electric device may fail by disintegrating partially or entirely. The piezo electric device may fail as a result of one or more cracks forming in the piezo electric device. The piezo electric device may fail by part or all of the piezo electric device melting. Prior to failure, the piezo electric device prevents escape of the pressurised fluid from the pressure vessels. The piezo electric device defines a volume and prior to failure of the piezo electric device the piezo electric device prevents escape of the pressurised fluid through the volume. After failure of the piezo electric device pressurised fluid can escape through some or all of the volume, depending upon the nature of failure of the piezo electric device. Failure may result in the piezo electric device being vibrated and reaching an amplitude of vibration which is sufficient to overcome the mechanical properties of the piezo electric device.

What is claimed is:

1. A method for releasing a fluid from a pressure vessel assembly, the method including the steps of providing: —
   a pressure vessel;
   a piezo electric device; and
   an electric field generator;
arranging the piezo electric device in a sealed relationship with a part of the pressure vessel, thereby providing the pressure vessel assembly,
providing a fluid contained within the pressure vessel assembly under pressure, and
using the electric field generator to apply an electric field to the piezo electric device, such that the piezo electric device fails, thereby releasing the fluid from the pressure vessel assembly.

2. The method as defined in claim 1 wherein the step of using the electric field generator to apply an electric field to the piezo electric device includes providing a fixed polarity electric field to cause the piezo electric device to fail.

3. The method as defined in claim 1 wherein the step of using the electric field generator to apply an electric field to the piezo electric device includes providing an alternating polarity electric field to cause the piezo electric device to fail.

4. The method as defined in claim 3 wherein the step of providing the alternating polarity electric field causes the piezo electric device to fail by overheating.

5. The method as defined in claim 3 wherein the step of providing the alternating polarity electric field causes the piezo electric device to fail due to fatigue.

6. The method as defined in claim 3 when the step of providing the alternating polarity electric field causes the piezo electric device to fail due to vibration.

7. The method as defined in claim 6 when the frequency of the alternating polarity electric field is proximate a natural frequency of the piezo electric device.

8. The method as defined in claim 6 wherein in use the piezo electric device has a range of natural frequencies and the frequency of the alternating polarity electric field is varied at least over some of the range.

9. The method as defined in claim 6 wherein in use the piezo electric device has a range of natural frequencies and the alternating polarity electric field frequency is a fixed frequency below the range.

10. The method as defined in claim 3 wherein the frequency of the alternating polarity electric field is greater than 10 kHz, preferably greater than 50 kHz.

11. The method as defined in claim 1 wherein the piezo electric device is in a compressed state when the fluid is contained within the pressure vessel assembly under pressure.

12. The method as defined in claim 1 wherein piezo electric device is frangible.

13. The method as defined in claim 1 wherein the piezo electric device is ceramic.

14. The method as defined in claim 1 wherein the piezo electric device has a predetermined region of failure.

15. The method as defined in claim 1 wherein the piezo electric device has a first face that faces towards the fluid contained within the pressure vessel assembly, and a second face that faces away from the first face.

16. The method as defined in claim 1 wherein there is provided a pressure conduit comprising an inlet fluidly isolated from the pressure vessel by the piezo electric device and the step of causing the piezo device to fail fluidly couples the pressure vessel assembly with the inlet wherein an inflatable device is connected to an outlet of the pressure conduit such that fluid flows through the pressure conduit into the inflatable device.

17. The method as defined in claim 1 wherein the pressure vessel assembly is operably coupled to a valve and release of fluid from the pressure vessel assembly changes the state of the valve.

18. A fluid release system including: —
   an electric field generator;
   a pressure vessel assembly for containing a fluid under pressure;
   the pressure vessel assembly comprising;
      a pressure vessel; and
      a piezo electric device in sealed engagement with a part of the pressure vessel;
arranged such that applying an electric field to the piezo electric device is capable of causing the piezo electric device to fail thereby releasing fluid from the pressure vessel assembly.

19. The fluid release system as defined in claim 18 wherein the piezo electric device includes a first piezo electric member polarised in a first direction and a second piezo electric member polarised in the first direction, a first electrode positioned between the first and second piezo electric members, a second electrode having a first part positioned on a side of the first piezo electric member opposite the first electrode and a second part positioned on a side of the second piezo electric member opposite the first electrode.

20. The fluid release system as defined in claim 18 wherein the piezo electric device includes a first piezo electric member polarised in a first direction and a second piezo electric member polarised in a second direction opposite to the first direction, a first electrode positioned on a first side of the piezo electric device and a second electrode positioned on a second side of a the piezo electric device opposite the first side.

* * * * *